Oct. 27, 1964 C. W. HILLCOURT 3,154,274
FISHING ROD HOLDER
Filed March 11, 1963
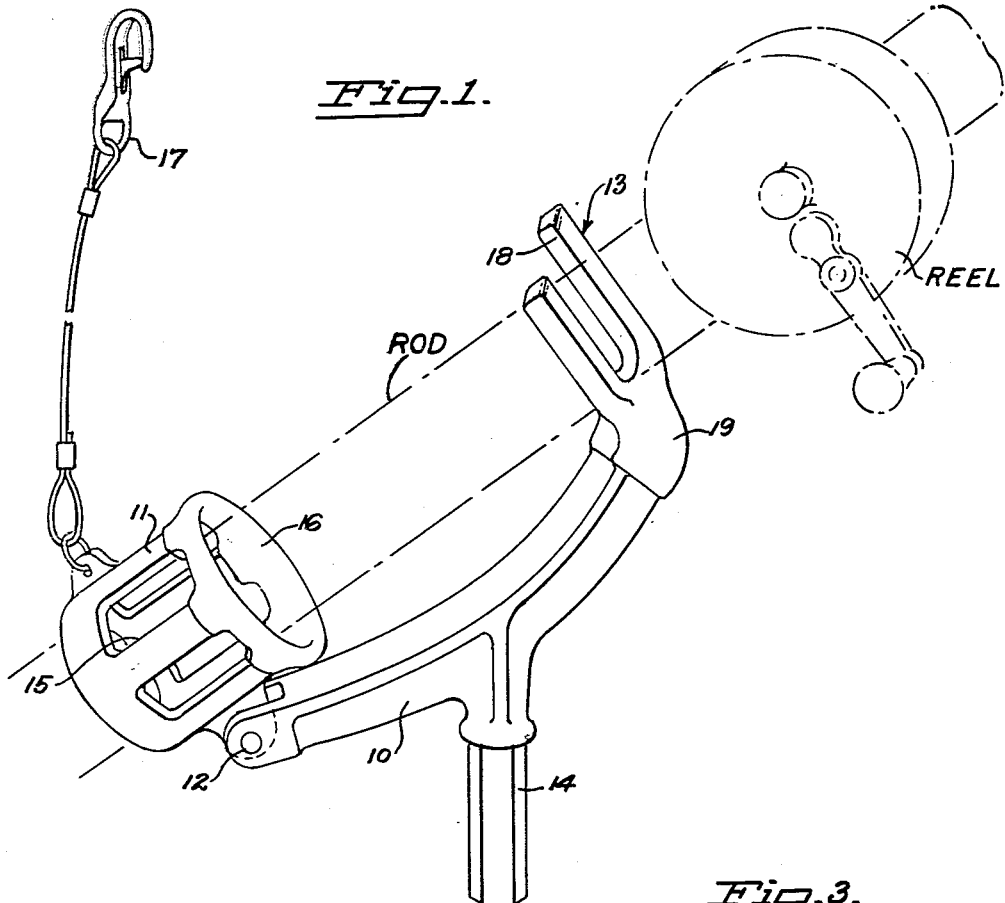
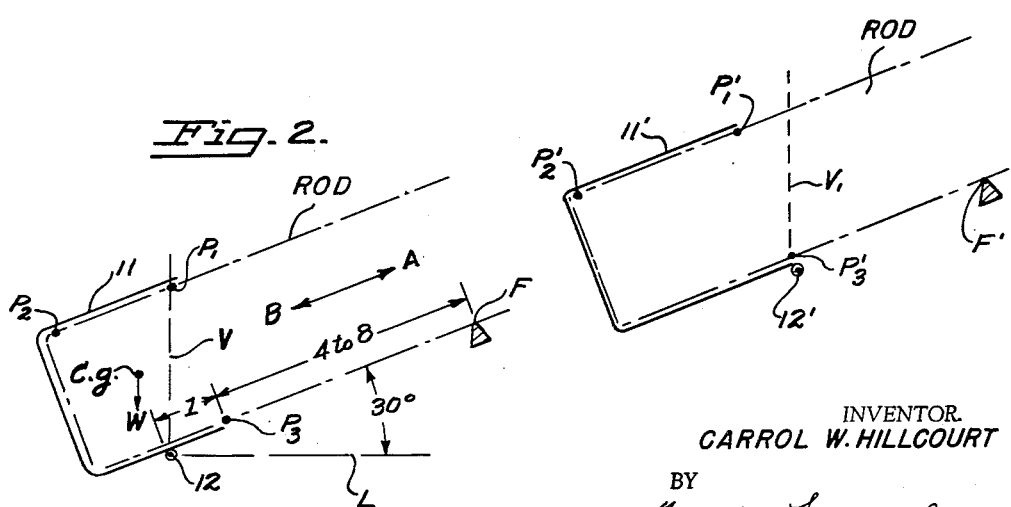
INVENTOR.
CARROL W. HILLCOURT
BY
Fryer + Ljunswold
ATTORNEYS United States Patent Office 3,154,274
Patented Oct. 27, 1964

3,154,274
FISHING ROD HOLDER
Carrol W. Hillcourt, 342 Liberty St.,
San Francisco 14, Calif.
Filed Mar. 11, 1963, Ser. No. 264,103
4 Claims. (Cl. 248—42)

This invention relates to a fishing rod holder and more particularly relates to a holder adapted to retain a fishing rod therein during all phases of a fishing venture.

Many attempts have been made to provide efficient means for retaining an unattended fishing rod. In addition, it is desirable to mount the rod in such a manner that a fish may be expeditiously "played" without having to jostle with special rod fastening means. These problems, particularly those of efficient rod retention, are greatly pronounced with respect to deep sea fishing ventures wherein the rod is subjected to sudden movements and forces of substantial magnitude. Such movements and forces are generally imparted to the fishing rod by the vessel, as well as by fish which are caught thereby. These movements tend to dislodge the rod from the holder.

Attempts have been made to remedy this situation by providing various types of ring and clamp arrangements. Further conventional arrangements comprise a pivoted cup member which function to support the butt-end of a fishing rod therein. Thus far, such arrangements have not been constructed and arranged to efficiently retain a rod within the holder, particularly a rod which is left unattended for a period of time. Furthermore, special fastening means must generally be removed before a fish can be "played." Attempts at such removal have oftentimes resulted in a lost fishing rod, as well as the fish.

This invention has attempted to remedy the above-mentioned problems by providing a holder comprising a uniquely mounted cup member which is adapted to efficiently retain a rod therein while yet permitting expeditious "playing" of a fish. In practical application, the fishing rod holder of this invention has been found to be far superior to those previously used.

In accordance with the above discussions, an object of this invention is to provide a fishing rod holder which will efficiently retain a fishing rod therein.

A further object of this invention is to provide a fishing rod holder comprising a uniquely arranged cup member which will efficiently retain a fishing rod therein even though the rod is subjected to various movements and forces.

Further objects of this invention will become apparent from the following description taken in connection with the accompanying drawings wherein:

FIG. 1 discloses a fishing rod holder embodying the novel concepts of this invention with a fishing rod, shown in phantom lines, retained therein;

FIG. 2 is an illustration more particularly disclosing novel structural relationships of this invention;

FIG. 3 is an illustration similar to FIG. 2, but disclosing comparative structures of a conventional fishing rod holder.

As shown in FIG. 1, the fishing rod holder of this invention comprises a T-shaped support member 10 having a bottom portion of cup member 11 pivoted thereon by pivot pin 12. The cup is pivotally mounted at the substantial mid-portion thereof and functions in conjunction with fork-shaped portion 13 arranged forwardly of the cup member to support a fishing rod in the position shown. As will be hereinafter more fully understood, the cup member is arranged in a novel manner whereby an unattended fishing rod will be retained therein during adverse fishing conditions.

Support member 10 forms a downwardly extending male fastening means 14 adapted to engage a mating female socket formed on a rail of a fishing vessel, for example. The pivoted cup member resembles a cylindrical cage comprising spaced slots 15 formed through the side walls thereof and arranged to extend between forward and rear portions of the cup member. These slots provide a visual aid for indicating the relative position of the butt-end of the rod within the cage.

As is well-known in the art, when a fish is "hooked" it is desired to permit a manual "playing" of the fish. To facilitate this maneuver, the cup member is pivotally mounted in the manner shown. Also, the rod may be expeditiously removed from the holder if so desired. Forward portions of the cup have a standard plastic coating 16 formed thereon to prevent damage to the rod and also aid in the rod retention function, as will be hereinafter more fully understood.

A conventional fastening means 17 may be attached to the cup member in the manner shown with the other end thereof adapted to be secured to the fishing reel. This fastening means provides a secondary safety feature should the rod and reel be inadvertently dislodged from the holder.

The forward end of the support member has fork-shaped portion 13 formed thereon in such a manner that the cut-out portion 18 thereof will be normally aligned with cup 11 to retain the rod in the manner shown. The lowermost surface portion forming the cut-out portion functions as a fulcrum means on which the rod is pivotally supported. The fork-shaped portion also has a plastic coating 19 formed thereon to prevent damage to the rod and also aid in the rod retention function.

The schematic illustration shown in FIG. 2 more particularly discloses the novel cup mounting features of this invention. It should be noted that the clearance between the outer surfaces of the butt-end of a commercial fishing rod and the inner surface portions of the cage member generally approximates one-quarter of an inch. Thus, when the rod is subjected to sudden movements and loads, the rod has a tendency to reciprocate in the direction of arrows A and B and subsequently "shake loose" from the cup in the direction of arrow A.

The prime purpose of the novel concepts herein disclosed is to afford a cup structure adapted to apply pressure to strategic points (actually limited areas) on the rod so as to retain it during relative movements between the cup and rod. It should be understood that an unattended fishing rod will normally be maintained in constant contact with fulcrum F, primarily due to the large weight or sinker which is attached to the end of a deep sea fishing line. This weight will have a tendency to urge the rod in a clockwise direction about the fulcrum. The additional weight of a large fish, such as a large salmon, to the line, sudden movement of the vessel and various other fishing conditions function to apply forces to the rod which will tend to dislodge it from the cup.

Compound movement of the rod in direction A and also in a clockwise direction about fulcrum F (due to the weight of the sinker) will function to apply a force at pressure point $P_1$ by the cup against the rod and also a second force in concert therewith at pressure point $P_2$. It should be noted that pressure point $P_1$, arranged on upper cup surface portions at an upper forward portion of the cup, is arranged substantially in a vertical plane passing through pivot pin 12. Such an arrangement has been found to afford a force component which acts through the pivot pin to aid in maintaining the cup in its desired rod holding position.

Assuming the pole moves in the direction of arrow B, forces applied to the rod by the cup at pressure points $P_2$ and $P_3$ will function in concert to provide a wedging function to retain the butt-end of the rod in the cup. Pressure point $P_3$ is arranged on lower cup surface portions located at a lower forward portion of the cup. During relative movement of the rod in this direction, cup 11 will attempt to pivot in a counterclockwise direction about pivot pin 12, to thus constantly apply pressure to the rod. It should be further noted that the center of gravity C.G. of the cup, arranged rearwardly of vertical plane V, is effective to normally apply pressure to the rod at pressure points $P_2$ and $P_3$ due to weight of the cup. The effective moment arm applying such pressure can be seen to constitute the horizontal distance between the center of gravity and vertical line V.

As further shown in FIG. 2, pressure point $P_3$ is arranged on an inner surface portion of the cup and preferably located between one-eighth and one-fourth the distance from pivot pin 12 to fulcrum F. The preferred distance is one-sixth for most applications. Also, a line substantially intersecting pivot pin 12, pressure point $P_3$ and fulcrum F is preferably arranged at approximately 30° relative to a horizontal plane or sea level L. These arrangements, when employed with the above described cup mounting features, have been found to substantially increase fishing rod holding efficiency. In particular, chance for human error is greatly reduced and the loss of a rod and reel is virtually prevented.

FIG. 3 discloses a conventional cup arrangement wherein a cup 11' is pivoted on a pivot pin 12', arranged adjacent the front end thereof. It should be noted that only a limited retaining effect, as between the cup and the rod, is provided at pressure points $P_1'$ and $P_2'$. As is well known in the art, point $P_3'$ provides little if any rod retaining forces since it is located at pivot pin 12. Also, pressure point $P_1'$ is arranged to the left of vertical plane V' and thus does not provide a rod stabilizing function as does corresponding pressure point $P_1$ of FIG. 2.

I claim:

1. A fishing rod holder comprising a cup member having lower forward and rear portions, said lower forward portions forming lower cup surface portions adapted to provide a pressure point for rod retention purposes, pivot means arranged between the lower forward and rear portions of said cup member and mounting said cup member on a support member and fulcrum means arranged forwardly of the lower forward portion of said cup member, said pivot means, the lower cup surface portions and said fulcrum means arranged in substantial alignment when said holder is in its normal fishing rod retention position, the lower forward cup surface portions located between one-eighth and one-fourth of the distance from said pivot means to said fulcrum means.

2. The invention of claim 1 wherein a line substantially passing through said pivot means, the lower cup surface portions and said fulcrum means is arranged to form an angle of approximately 30° with respect to a horizontally disposed plane having said pivot means lying therein.

3. The invention of claim 1 wherein said cup member has an upper forward portion forming upper cup surface portions adapted to provide a pressure point for rod retention purposes, said upper cup surface portions arranged substantially in a vertical plane passing through said pivot means and wherein the center of gravity of said cup member is arranged rearwardly of said vertical plane.

4. A fishing rod holder comprising a cup member adapted to retain a butt-end of a fishing rod therein, said cup member having spaced slots formed through the side walls thereof and arranged to extend between forward and rear portions of said cup member, a support member, means pivotally mounting a bottom portion of said cup member on said support member at a substantial midportion of said cup member, a fork-shaped portion arranged on said support member forwardly of said cup member and a plastic coating arranged on the forward portions of said cup member and on said fork-shaped member.

References Cited in the file of this patent

UNITED STATES PATENTS

| | | |
|---|---|---|
| 2,515,426 | Rodgers | July 18, 1950 |
| 2,617,616 | Lavender | Nov. 11, 1952 |
| 2,692,106 | Herrmann | Oct. 19, 1954 |
| 2,900,152 | Hahn | Aug. 18, 1959 |
| 2,981,509 | Messenger et al. | Apr. 25, 1961 |